United States Patent
Venkatesh et al.

(10) Patent No.: US 9,544,179 B2
(45) Date of Patent: Jan. 10, 2017

(54) ACCELERATING USB REDIRECTION OVER A NETWORK

(71) Applicant: Dell Products L.P., Round Rock, TX (US)

(72) Inventors: Ramanujam Kaniyar Venkatesh, Bangalore (IN); Vishwanath Biradar, Bangalore (IN); Manish Bhaskar, San Jose, CA (US); Sriram Kumar Raju, Bangalore (IN); Puneet Kaushik, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 14/281,650

(22) Filed: May 19, 2014

(65) Prior Publication Data

US 2014/0330978 A1    Nov. 6, 2014

(30) Foreign Application Priority Data

Nov. 15, 2013 (IN) ............................ 5264/CHE/2013

(51) Int. Cl.
*G06F 15/173* (2006.01)
*H04L 29/08* (2006.01)
*G06F 13/00* (2006.01)

(52) U.S. Cl.
CPC ......... *H04L 29/08567* (2013.01); *G06F 13/00* (2013.01); *H04L 67/125* (2013.01)

(58) Field of Classification Search
CPC ... H04L 29/08567; H04L 67/125; G06F 13/00

USPC ....................................................... 709/226
See application file for complete search history.

(56) References Cited

U.S. PATENT DOCUMENTS

| | | | | |
|---|---|---|---|---|
| 8,365,168 B1* | 1/2013 | Kodorkin | ............ | G06F 9/45558 718/1 |
| 2005/0210176 A1* | 9/2005 | Zarns | ................. | H04L 12/4625 710/315 |
| 2007/0005867 A1* | 1/2007 | Diamant | ............... | G06F 13/385 710/306 |
| 2007/0011374 A1* | 1/2007 | Kumar | ................... | G06F 9/4411 710/105 |
| 2009/0150550 A1* | 6/2009 | Barreto | ............. | H04L 29/08846 709/228 |
| 2012/0158822 A1* | 6/2012 | Dai | ....................... | G06F 9/4413 709/203 |
| 2013/0132620 A1* | 5/2013 | de Goede | ............ | G06F 13/105 710/53 |
| 2013/0132960 A1* | 5/2013 | de Goede | ................. | G06F 9/46 718/101 |
| 2013/0246663 A1* | 9/2013 | Raveendran | ........ | G06F 13/4022 710/8 |

(Continued)

*Primary Examiner* — James Conaway

(74) *Attorney, Agent, or Firm* — Baker Botts L.L.P.

(57) ABSTRACT

In particular embodiments, a client computing device identifies a USB device connected to the client computing device. The client computing device redirects the USB device to a remote server computing device. The client computing device determines whether the USB device is of a particular device type, and if the USB device is determined to be of the particular device type, then the client computing device requests data from the USB device. Upon receiving a response from the USB device comprising data, the client computing device sends the data to the remote server computing device.

20 Claims, 10 Drawing Sheets

(56) References Cited

U.S. PATENT DOCUMENTS

| | | | |
|---|---|---|---|
| 2014/0082235 A1* | 3/2014 | Kaushik | G06F 13/102 710/62 |
| 2014/0164648 A1* | 6/2014 | Barber | G06F 13/122 710/8 |
| 2014/0317418 A1* | 10/2014 | Lin | H04L 63/0471 713/190 |

* cited by examiner

ACCELERATING USB REDIRECTION OVER A NETWORK

PRIORITY

This application claims the benefit of priority under 35 U.S.C. §119(a) of Indian Application No. 5264/CHE/2013, filed on 15 Nov. 2013, the entirety of which is incorporated herein by reference.

TECHNICAL FIELD

This disclosure generally relates to remote computing and, in particular, relates to redirecting USB device data to a server.

BACKGROUND

As the value and use of information continues to increase, individuals and businesses seek additional ways to process and store information. One option available to these users is information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

DESCRIPTION OF EXAMPLE EMBODIMENTS

Figure 1:
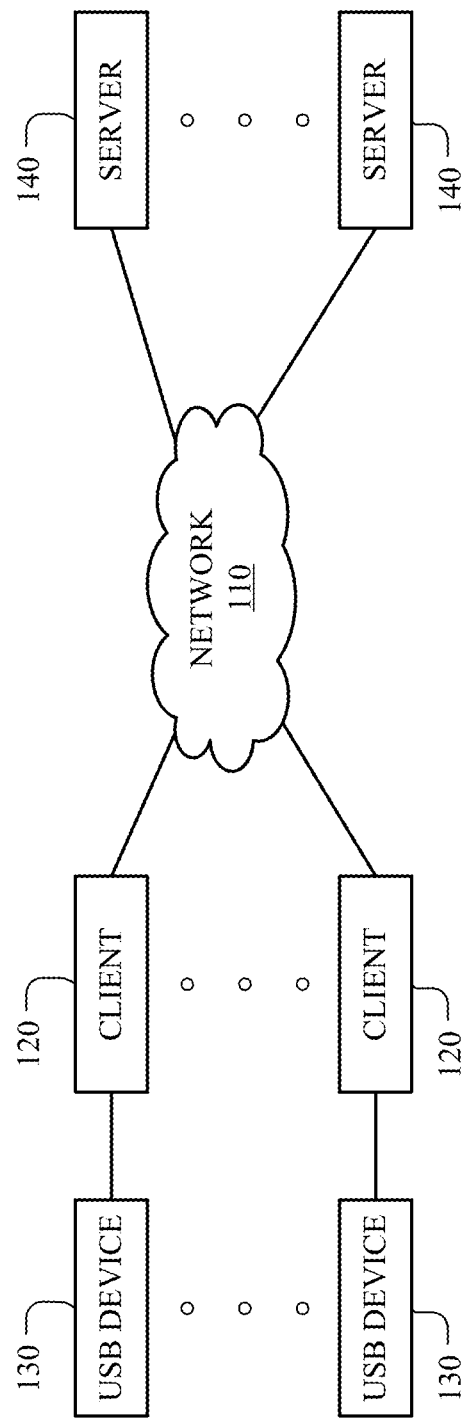
FIG. 1 illustrates an example configuration of networked information handling systems.

This disclosure generally relates to remote computing and, in particular, relates to redirecting a local interface to a second computing system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory.

As used herein, a "local" device of a system, or a device "locally" connected to a system, may be a device directly connected to the system using one or more wires or connectors of any suitable type (e.g., physically connected to the system), a device indirectly connected to the system using one or more hubs, or a device directly connected to the system using a wireless link (e.g. via a local area network, wide area network, or the Internet). Furthermore, in one aspect of the present disclosure, a local device of a system or a device locally connected to a system may include a device within the system (e.g., an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. In some cases, it may be advantageous to make devices (e.g. peripheral devices) connected locally at one client device available to one or more other information handling systems on the network. In particular embodiments, a local device connected to a client device may include a Universal Serial Bus (USB) device including, for example, a printer, a scanner, a webcam, a speaker, a microphone, a mouse, a keyboard, a monitor, a projector, a television, an authentication device, a storage device, a USB hub, or any other suitable device equipped with USB functionality. In particular embodiments, a local device connected to a client device using USB technology may be an electronic signature device (e.g. a sign pad device), which may, for example, capture the digital signature of a user.

Some devices that may be locally connected to a client device are composite devices having one or more interfaces and possibly one or more functions. For example, a combination printer/scanner may have separate logical interfaces associated with its printing and scanning functions. Similarly, a webcam may have separate interfaces for audio and video. In particular embodiments, a composite device may include a USB device having multiple interfaces. In yet other embodiments, a composite device may include a USB device having a single interface.

According to the present disclosure, one or more individual interfaces associated with a single composite device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a printer/scanner were connected to a client device via a standard universal serial bus (USB) connection, the client device might separate the interfaces for the printer and scanner. The scanner may then be installed locally for use by the client device to which it is directly connected. The printer interface, however, might be redirected to a server. The server could then treat the printer interface as a virtual device attached to the server. Alternatively, the printer interface could be redirected to one server and the scanner interface could be redirected to a second server.

FIG. 1 illustrates an example configuration of a networked information handling system. In particular embodiments, one or more client devices 120 and one or more servers 140 are connected via network 110. Many types of peripheral devices may be connected locally to the client devices 120. As shown in FIG. 1, in some embodiments, one or more USB devices 130 connect to the client devices 120. According to the present disclosure, one or more interfaces of USB devices 130 may appear to one or more of servers 140 as if they are locally installed on and connected to those servers 140, while other interfaces associated with USB devices 130 may be locally installed on their respective client devices 120. In some cases, interfaces associated with a USB device 130 on one client device 120 may be redirected such that it appears to be locally installed or remotely shared with another client device 120.

Figure 2:
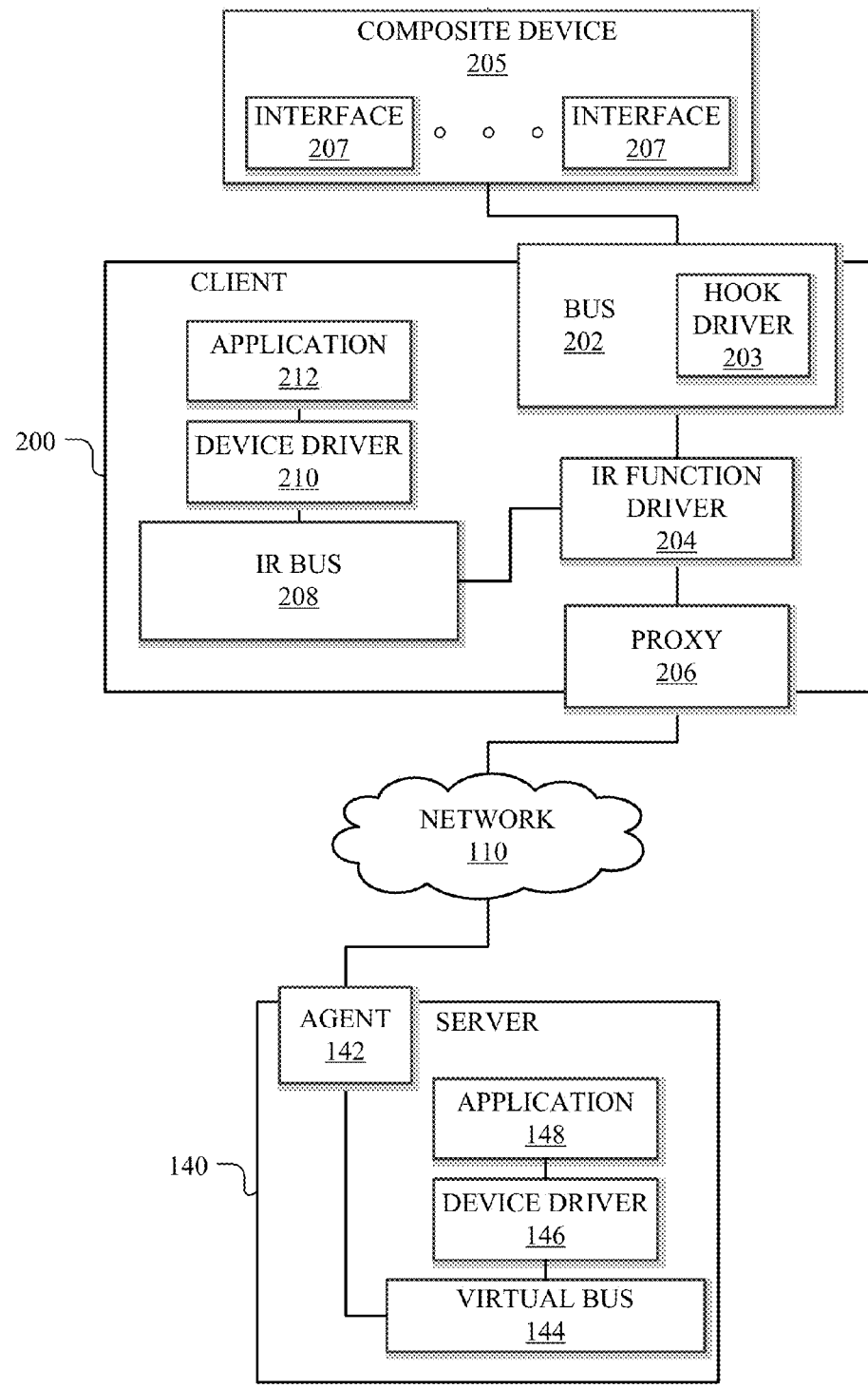
FIG. 2 illustrates example system of a networked client and server that supports redirection of interfaces associated with a composite device.

FIG. 2 illustrates an example embodiment of a system configured to redirect interfaces associated with a composite device. In particular embodiments, client device 200 connects to server 140 via network 110. Client device 200 recognizes composite device 205, which is connected locally. Composite device 205 may have only one interface 207 or multiple interfaces 207. When composite device 205 is initially connected to client device 200, client device 200 may attempt to initialize composite device 205 by attempting to load a driver. According to the present disclosure, client device 200 may determine (or may permit a user to determine) whether to redirect one or more interfaces 207 associated with composite device 205 upon connection of the composite device 205, as part of the initialization of composite device 205. In particular embodiments, client device 200 may make a new determination regarding the installation of composite device 205 after composite device 205 has been initialized. For example, a user may decide that interface 207 of composite device 205 that was previously installed on its local client device 200 should be redirected to server 140.

In the example embodiment shown in FIG. 2, a redirection hook driver 203 hooks a bus 202 associated with the operating system running on client device 200. Hook driver 203 may interrupt the automatic operation of the operating system, since the operating system may be configured to automatically identify a driver for composite device 205 and attempt to install composite device 205 locally. In particular embodiments, hook driver 203 may change a device identifier associated with composite device 205. Because device identifiers may be used to determine which driver should be associated with a device, changing the device identifier associated with composite device 205 can direct the operating system to an interface redirection function driver (IR function driver) 204.

IR function driver 204 may read descriptors for composite device 205. If composite device 205 is a USB device, IR function driver 204 may read the device descriptor, configuration descriptor, and interface descriptors from composite device 205, then parse the interface descriptors to create one or more independent virtual devices associated with interfaces 207. IR function driver may then generate updated configuration descriptors and device descriptors for the new virtual devices associated with interfaces 207.

The virtual devices associated with interfaces 207 may be virtual composite devices. In such cases, the virtual devices will be identified as composite devices, but may have fewer interfaces 207 associated with them than the total number of interfaces associated with physical composite device 205. For example, a first virtual device may be identified as a printer/scanner composite device, but the virtual device may only have a single interface 207, such as the printer interface. A second virtual device may be created (likewise identified as a composite device) for the scanner interface.

Interfaces 207 may be grouped functionally, such that all interfaces 207 necessary for a particular function of the device to operate are kept together in a single virtual device. For example, a composite USB printer/scanner device may have multiple interfaces associated with the printing function and multiple interfaces associated with the scanning function. For some such devices, all printing-related interfaces may need to be grouped into a single virtual device. For other devices, it may be possible to isolate certain interfaces associated with printing and create multiple independent virtual devices associated with various aspects of the printing function. Interfaces associated with the scanning function may operate similarly; all scanning-related interfaces may need to be grouped into a single virtual device for some composite devices, but may be separable for other composite devices. Interface 207 may be bound together in a group with another interface 207. Interface 207 may be bound with another interface 207 based on function or on other criteria, to ensure that such grouped interfaces are not mounted or virtualized at different information handling systems.

Client device 200 may be configured to automatically install all or certain composite devices or interfaces locally, may be configured to automatically redirect all or certain composite devices or interfaces to server 140, or may be configured to request input from a user of client device 200 or from another source to determine whether to install a particular device or interface locally or to redirect it. Certain devices, such as hubs, may also be precluded from redirection.

If an interface 207 is configured to be used locally at client device 200, IR function driver 204 sends the virtual device associated with that interface 207 to an interface redirection bus driver (IR bus) 208. IR bus driver 208 may then notify the operating system (OS) that the virtual device associated with interface 207 is available. The OS may then query the IR bus driver for the device details, locate and run device driver 210 associated with composite device 205, and create a device stack for the virtual device. For example, IR bus driver 208 may notify the plug-and-play (PNP) manager in a Windows operating system that the virtual device is available. The PNP manager could then complete the initialization of the virtual device on client device 200 and make the virtual device available to one or more applications 212.

If an interface 207 is configured to be redirected to server 140, once the IR function driver 204 prepares the information for the virtual device associated with interface 207, the redirection of interface 207 may operate generally as described in U.S. Pat. No. 8,010,630 to Barreto, et al., which is incorporated herein by reference. A proxy module 206 on client device 200 may coordinate communications between composite device 205 and an agent 142 running on server 140. In particular, proxy 206 may be configured to receive socket connection information from server 140 and initiate redirecting device transactions to and from composite device 205 to agent 142 on server 140.

Agent 142 may be configured to register with the operating system of server 140 to receive notification of an establishment of a remote access connection between client device 200 and server 140. When agent 142 receives the notification, it can determine what devices have connected to server 140 and when they connected, and can thus determine when and from where the local device redirection is to be initiated.

Virtual bus 144 receives information about redirected interface 207 from agent 142. Virtual bus 144 then calls device driver 146 associated with interface 207, which completes the initialization of the virtual device associated with interface 207 on server 140. The virtual device associated with redirected interface 207 then functions as if interface 207 of composite device 205 were locally connected to server 140. The virtual device associated with redirected interface 207 may thus be made available to application 148 running on server 140, which can treat the virtual device as a local device.

In order for an interface 207 to work properly as a virtual device, it may be necessary under some operating systems to instruct the operating system that the virtual device does not include all interfaces 207 associated with composite device 205. This may be unnecessary in certain circumstances when the virtual device is presented as a composite device, but may be preferable to specifically instruct the operating system in this manner at least when the virtual device is identified as single non-composite device. For example, when creating a non-composite virtual device based on an interface 207 associated with composite device 205, if the unmodified device identifier for composite device 205 is passed to server 140 and the operating system is not otherwise configured to distinguish between virtual devices comprising a subset of interfaces 207 and composite devices 205 comprising all interfaces 207, composite device 205 may not function properly because the operating system expects all interfaces 207 associated with that composite device 205 to be available.

In accordance with the present disclosure, the specific interface 207 associated with the virtual device can be identified to the software running on client device 200 and server 140 as appropriate. For example, in the case of a redirected interface 207, the interface number associated with interface 207 can be passed, along with other information relating to composite device 205 (such as the device identifier for composite device 205), to server 140. A new device identifier may be created for the virtual device by appending the characters "&MI_" followed by the interface number to the normal device identifier. If the device identifier were USB\\Vid_1234&Pid_5678&Rev_9abc and the redirected interface 207 were interface number 02 for composite device 205, the modified device identifier for the virtual device associated with redirected interface 207 would be USB\\Vid_1234&Pid_5678&Rev_9abc&MI_02. In this manner, the operating system is notified of the interface 207 associated with the virtual device and can properly load the device driver 146 associated with interface 207 without expecting all interfaces 207 associated with composite device 205 to be available. The same process may be used for interfaces 207 that are installed locally, with the interface number being appended to the device identifier in order to instruct the operating system about the interface 207 associated with the virtual device.

Figure 3:
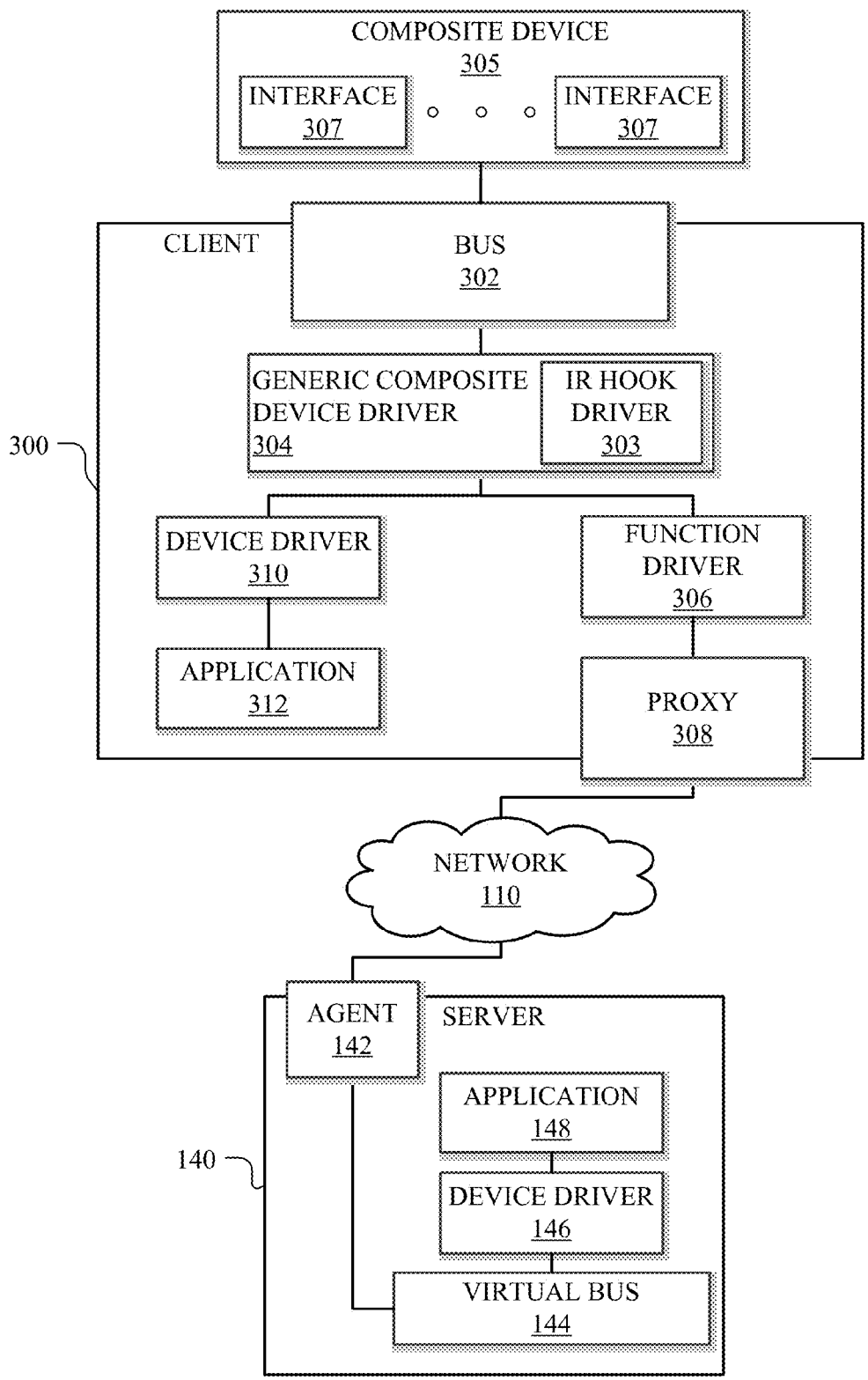
FIG. 3 illustrates another example system of a networked client and server that supports redirection of interfaces associated with a composite device.

FIG. 3 illustrates another example embodiment of a system configured to redirect interfaces associated with a composite device. In that embodiment, composite device 305 having interfaces 307 is connected to client device 300 via bus 302. Bus 302 may be, for example, a universal serial bus. Interface redirection hook driver (IR hook driver) 303 hooks generic composite device driver 304. Generic composite device driver 304 may be configured automatically to attempt to locate the appropriate driver for devices connected to client device 300 via bus 302. Because of IR hook driver 303's hooks in generic composite device driver 304, generic composite device driver 304 refers to IR hook driver 303 to discover information about composite device 305.

In particular embodiments, generic composite device driver 304 comprises a Microsoft usbccgp driver. In particular embodiments, if the operating system running on client device 300 is Windows 7 and bus 302 is a universal serial bus, IR hook driver 303 may hook the PNP routine of the Microsoft usbccgp driver. The generic composite device driver 304 may attempt to parse device 305 to identify interfaces 307 associated with generic composite device driver 304, after which the Windows PNP manager may query generic composite device driver 304 to get information about interface 307. Because of IR hook driver 303's hooks in generic composite device driver 304, IR hook driver 303 may manage provisioning of information regarding interfaces 307 to generic composite device driver 304. In particular embodiments where generic composite device driver 304 comprises the Microsoft usbccgp driver, IR hook driver 303 may manage provisioning through the Windows PNP manager.

If an interface 307 is configured to be used locally on client device 300, generic composite device driver 304 loads device driver 310 associated with composite device 305, such that interface 307 is available to applications 312 running on client device 300.

If an interface 307 is configured to be redirected to server 140, IR hook driver 303 assigns a device identifier to interface 307 that is associated with function driver 306. When IR hook driver provides that device identifier to generic composite device driver 304, generic composite device driver 304 loads function driver 306 for the interface 307 that should be redirected. Function driver 306 is responsible for redirecting interface 307 to proxy 308 as a virtual device. Function driver 306 may thus generate configuration, interface, and device identifiers for the virtual device associated with interface 307.

From this point, the system may operate similar to the embodiment shown in FIG. 2. Proxy 308 coordinates communications between composite device 305 and agent 142 across network 110. Virtual bus 144 calls device driver 146, after which interface 307 is available as a virtual device to application 148.

Figure 4:
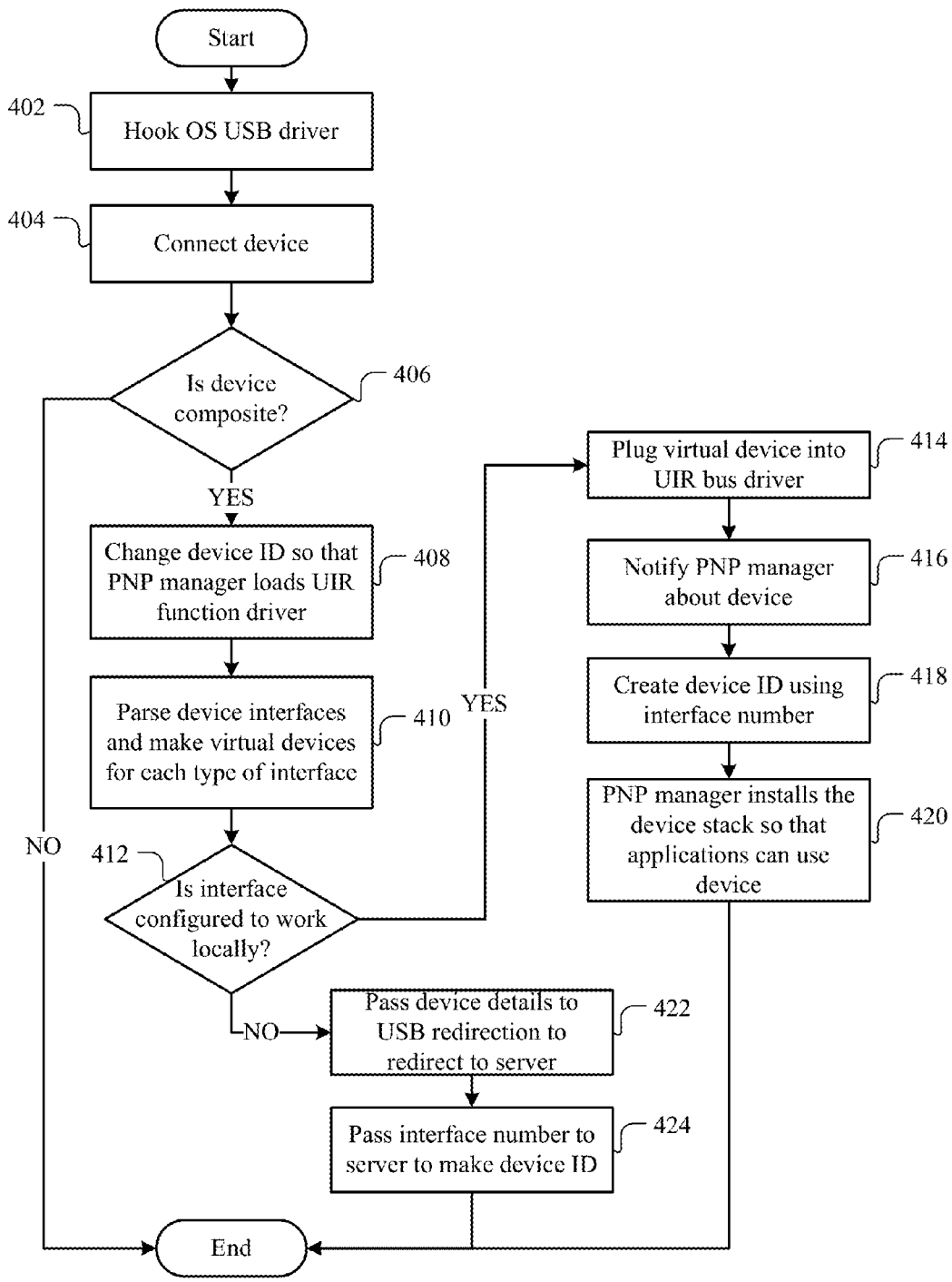
FIG. 4 illustrates an example of steps involved in one method of redirecting interfaces associated with a composite USB device.

FIG. 4 is a flow chart in accordance with an embodiment of the present disclosure relating to universal serial bus devices. At 402, interface redirection software hooks the operating system USB driver so the operating system USB driver calls the appropriate driver to support redirection of the device or interface, as appropriate. At 404, a USB device is connected to the client device.

At 406, the client device determines whether the attached USB device is composite. If so, the device identifier for the USB device is changed in step 408 so the PNP manager (or its equivalent in whatever operating system is installed on the client device) loads the USB interface redirection (UIR) function driver. The UIR function driver then parses the interfaces associated with the USB device and creates distinct virtual devices for separable groups of interfaces, as shown at 410.

If the interface is determined to be configured to work locally at step 412, the process moves to 414, where the virtual device is presented to the UIR bus driver. Then at 416, the UIR bus driver notifies the PNP manager about the virtual device, and at 418, a device ID is created for the virtual device that includes the interface number for the interface associated with the virtual device. In step 420, the PNP manager installs the device stack, completing configuration of the virtual device. At that point, the virtual device is available for use by applications.

Although, as installed, the USB device from FIG. 4 is described as a virtual device above, there may be no difference between such a virtual device and a non-virtual device, at least under certain circumstances. For example, if all interfaces associated with a composite USB device are configured to be installed locally, the installed USB device is locally connected and locally administered, and it may function as it would on a client device without redirection capabilities. If, however, certain interfaces associated with the USB device are configured to be installed locally while others are configured to be redirected, the interfaces installed locally may be repackaged into virtual devices, since they do not comprise all of the interfaces associated with the composite device.

If the interface is not configured to work locally in step 412, information about the device is passed to a redirection module to coordinate redirection of the interface to a server, as shown in step 422. The server may then generate a new device identifier for the virtual device associated with the redirected interface, as shown in step 424. In the embodiment illustrated in FIG. 4, the device identifier for the virtual device comprises the interface number for the redirected interface.

Figure 5:
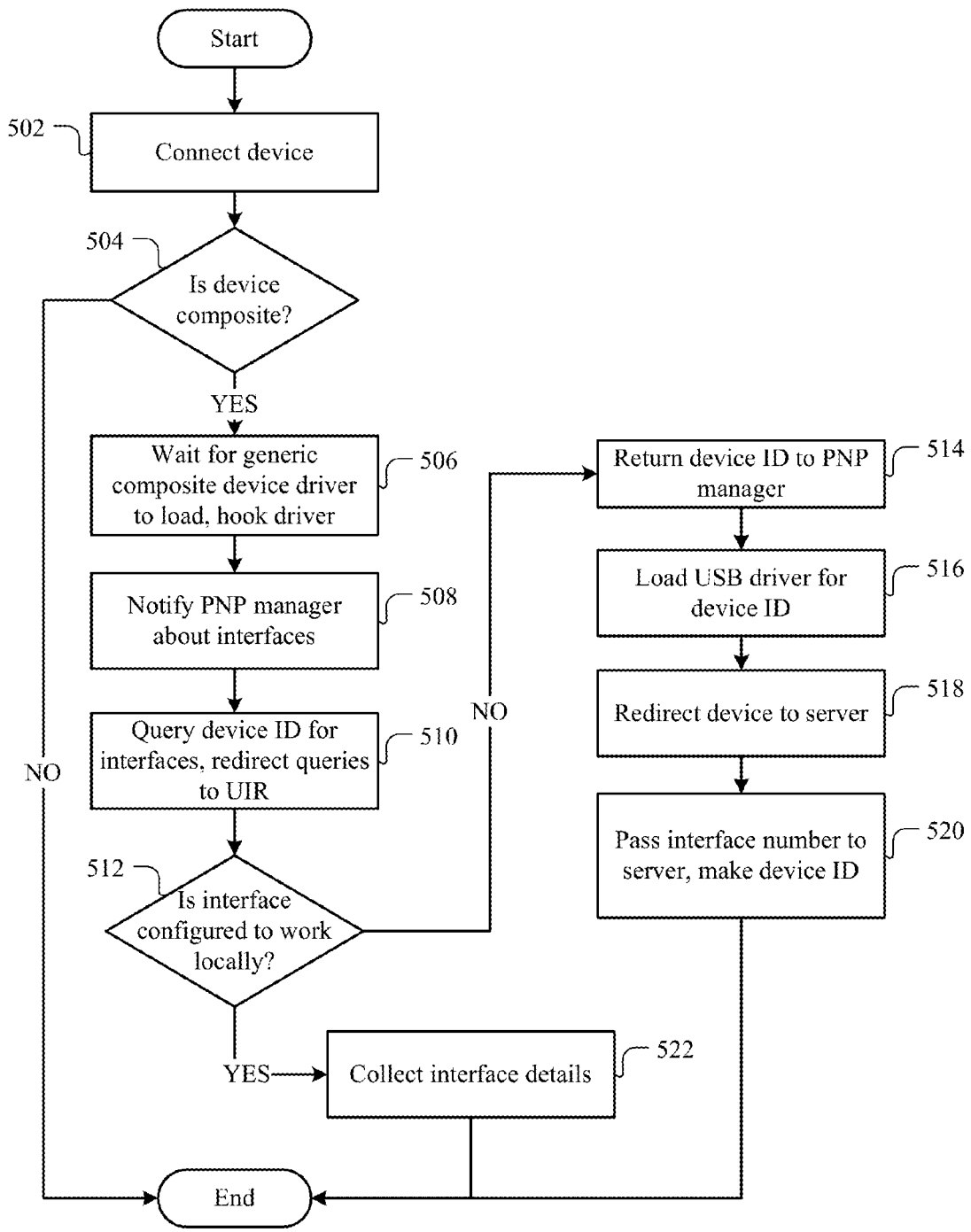
FIG. 5 illustrates an example of steps involved in another method of redirecting interfaces associated with a composite USB device.

FIG. 5 is a flow chart in accordance with another embodiment of the present disclosure. After the device is connected in 502, the method determines whether the device is composite in 504. If so, the operating system driver loads, and the driver is hooked in step 506 so queries for more information about the composite device go through the proper channels. At 508, the generic composite device driver notifies the PNP manager (or its equivalent in whatever operating system is installed on the client device) about the interfaces associated with the composite device, and at 510, the PNP manager asks for information about the interfaces. Those queries are redirected to an interface redirection module via the hook driver loaded in step 506. In step 512, the configuration information for the interfaces is checked, and it is determined whether the interfaces are configured to work locally. If so, the interface details are collected in step 522, after which the operating system is able to complete the local installation of the device interfaces.

If an interface is not configured to work locally, the device identifier for the USB device is returned to the PNP manager in step 514. Then in step 516, the USB driver for the device identifier specified is loaded, and in step 518, the device information is redirected to a server. In step 520, the interface number for the redirected interface is passed to the server, and the server generates a device identifier for its virtual device that comprises the interface number.

Step 520 may be unnecessary in some embodiments. For example, after the USB driver is loaded for the device identifier in step 516, a determination may be made as to whether the interface should be redirected as a composite virtual device or a non-composite virtual device. Once that determination has been made, the device descriptor for the virtual device may be updated accordingly. If the device is to be redirected as a composite virtual device, it may be unnecessary to pass the interface number to the server in order to modify the device identifier, as in step 520. Instead, the descriptors associated with the virtual device may include necessary information about the interface(s) associated with the virtual composite device.

Figure 6:
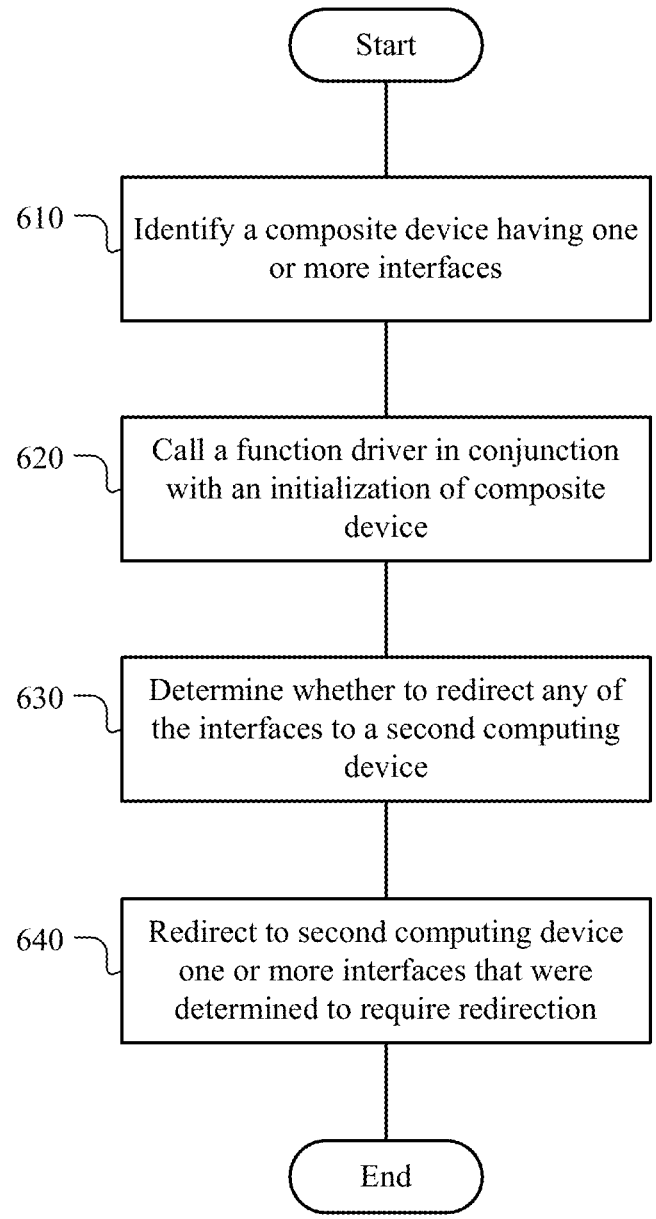
FIG. 6 illustrates example method of redirection of an interface.

FIG. 6 illustrates an example method of redirecting an interface associated with a composite device. At step 610, a composite device having one or more interfaces is identified. At step 620, a function driver is called in conjunction with initialization of the composite device. At step 630, it is determined whether any of the interfaces associated with the composite device should be redirected to a second computing device, such as a remote server. That determination may be made based on current or stored information, including stored configuration information or real-time input from a user or administrator. At step 640, any interfaces that were determined to require redirection are redirected to a second computing device.

In particular embodiments, one or more interfaces of a USB device (e.g. composite device 205) connected to a client may be redirected to a server (e.g. using any suitable systems or methods including those disclosed herein). The USB device may thus be made available to an application (e.g. application 148) at the server. The application at the server may, for example, be running on top of an operating system of the server. In particular embodiments, an application running on the server (or the operating system of the server) may request data from the USB device connected to the remote client. As an example, in accordance with the USB request/response architecture, an application running on the operating system of the server (e.g. 140) may initiate a request for data from a USB device (e.g. 205) connected locally to a client device (e.g. 200) that is separate from and remote from the server (e.g. 140). The request sent by the application (or operating system) running on the server may be sent to the client device via a server-side USB redirection component (e.g. agent 142) and over a network such as network 110 (e.g. a WAN or a LAN). The request may be sent between the client and server using any suitable protocol, including for example, Microsoft RDP, Citrix ICA, VMView RDP, or VMView PCoIP. The request may be forwarded by a client-side USB redirection component (e.g. proxy 206) to an interface redirection driver running in the client device (e.g. IR Function Driver 204), and the interface redirection driver may, for example, forward the request to a bus driver of bus 202. The bus driver may then forward the request to the USB device. Based on this request from the server-side application (or operating system), the USB device may respond with the requested data (e.g. to the driver), and the data may be sent to a client-side USB redirection component (e.g. proxy 206), which then forwards the requested data to the server using redirection, as disclosed herein. The data sent from the client to the server may, in particular embodiments, belong to a particular class of USB transfer data. For example, the data may be USB BULK, USB INTERRUPT, USB ISOCHRONOUS, or USB CONTROL data, as appropriate. In accordance with the request/response architecture of USB, the server-side application (or operating system) does not make its next request of the USB device until its previous (e.g. outstanding) request is served.

In particular embodiments, a USB device connected to a client may discard data after a certain amount of time. In these embodiments, if data is not read from the device within this certain amount of time, it is lost. As an example, a sign pad USB device may discard its data every 5 milliseconds, such that if signature data is not read from the sign pad device within 5 milliseconds, the data will be lost. If such a USB device (e.g. a sign pad) is redirected from a client to a server, then latencies in the network between the client and the server (e.g. if the network is a WAN, latencies on the order of 10 milliseconds, 20 milliseconds, or 150 milliseconds) may cause server request times and USB device response times to increase. The USB device may potentially not receive a request for data (e.g. due to network latency) before the data is discarded, causing less than desirable performance by the server-side application.

In particular embodiments, instead of waiting for a request from a server-side application, a component at the client (e.g. a part of proxy 206) may make one or more requests for data from the USB device. The client-side component may, for example, make a request for data from the USB device and only make its next request once the original request has been responded to by the USB device. The client-side component may make requests for data the moment it detects the USB device is plugged in (and, for example, is of a particular type). If, for example, the client-side component does not receive a response from the USB device (e.g. because there is no activity at the device or because the device has been removed), then the client-side component may "hang" (e.g. not make its next request of the USB device). The client-side component may pump the data it receives from the USB device to the server regardless of whether the server-side application has made any requests for data or not. If, for example, data is flowing in from the USB device, the client-side component may initiate real-time sampling (e.g. with high data rate) of the data from the USB device. In particular embodiments, the client-side component will not forward any requests from the server-side application for data from the USB device, as the client-side component is already making requests of the USB device. This may simulate, at the client side, the client-server request and response process described above.

In particular embodiments, the server (e.g. a component at the server, such as agent 142) may receive the data from the USB device and may queue all of the received data from that particular USB device. In the case of redirecting multiple interfaces or multiple USB devices, the server may have a separate queue for each interface or each USB device, as appropriate. When, for example, an application (e.g. 148) on the operating system of the server makes a request for the data (e.g. if a credit card authorization application makes a request for signature data from a sign pad USB device), the application or operating system is served data directly from the server-side queue, without need for sending the request over the network (e.g. a WAN) to the client device. In this manner, the performance of the server-side application may not be negatively impacted by latencies of the network, and a full virtual USB device having data is simulated at the server.

In particular embodiments, the server-side queue containing data received from a USB device may implement aging logic. For example, when data in the queue is older than a configurable, pre-set amount of time (e.g. 500 milliseconds, 350 milliseconds, 70 milliseconds, etc.), the data may be removed from the queue. This may, for example, prevent the server-side application from receiving excessively old data at the time of its data request. In particular embodiments, the age of data in the queue is measured by the amount of time elapsed since the server received the data from the client.

Figure 6A:
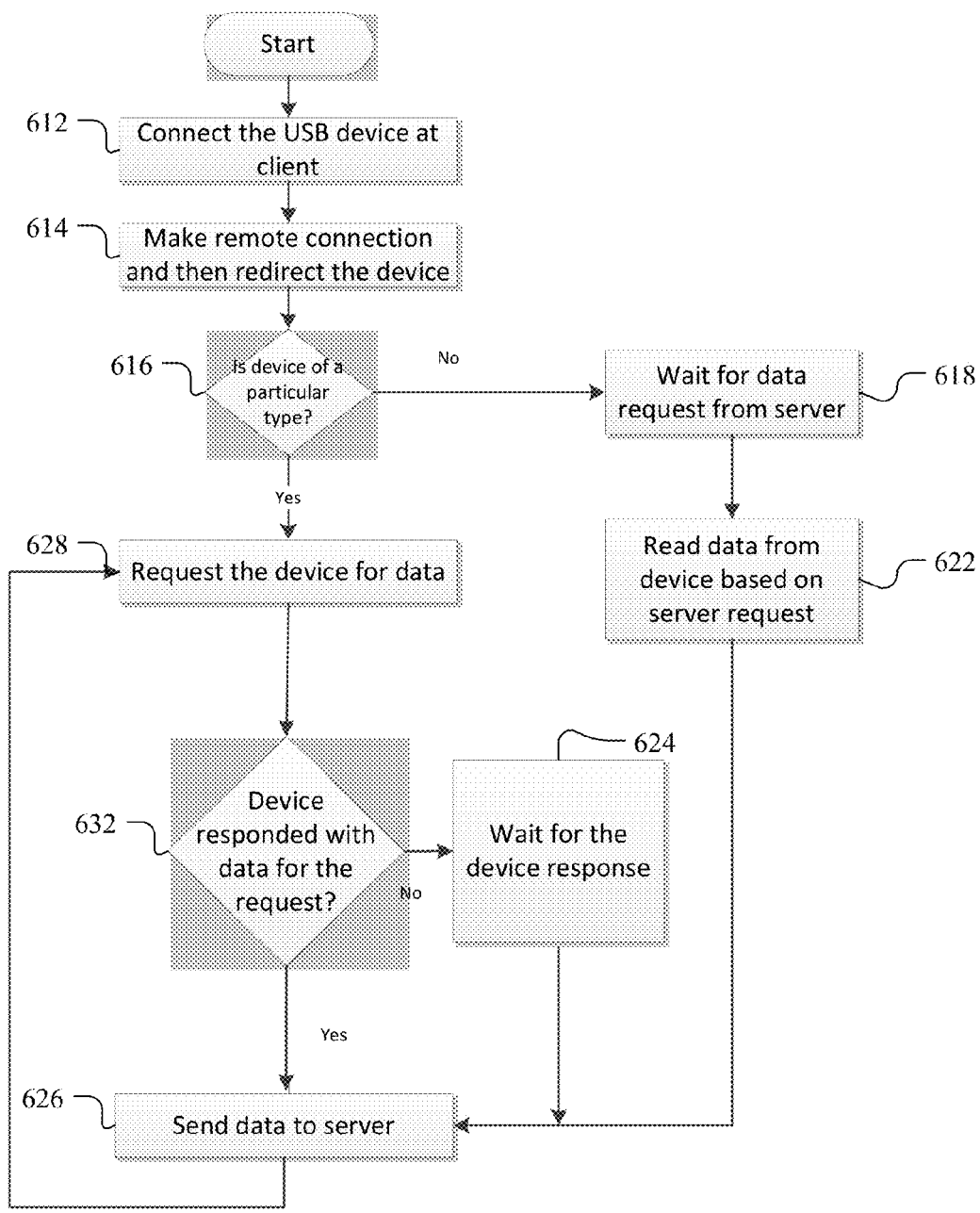
FIG. 6A illustrates an example method for redirecting USB device data to a server.

An example flow of the client-side process for redirecting USB device data to a server is shown in FIG. 6A. In the example of FIG. 6A, at step 612, a USB device is connected at the client. At step 614, a remote connection is made to the server and the USB device is redirected to the server (e.g. using any suitable protocol, as described herein). A client-side component may determine, at step 616, whether the USB device is of a particular type (e.g. a sign pad device or an authentication device). If the USB device is not of a particular type, then at step 618, the client will wait for a data request from the server (e.g. an application or operating system of the server) and then at step 622 will read data from the USB device only after receiving a server request. Once the USB device responds with data (e.g. in step 624), the data is sent to the server in step 626, where the process ends. If, however, the USB device is of a particular type (e.g. a sign pad device), then at step 628 client-side component requests the USB device for data. If the USB device responds with data in step 632, then the client-side component forwards the data to the server. If, however, the USB device does not respond, the client-side component waits for the USB device's response without sending any further data requests to the USB device. FIG. 6C illustrates an additional example flow of the client-side process. At step 662, a client computing device may identify a USB device connected to the client computing device. At step 664, the client computing device may redirect the USB device to a remote server computing device. At step 666, the client computing device may determine whether the USB device is of a particular device type. If the USB device is of a particular device type, then at step 668, the client computing device may request data from the USB device and at step 672 may, upon receiving a response from the USB device, send data to the remote server computing device.

Figure 6B:
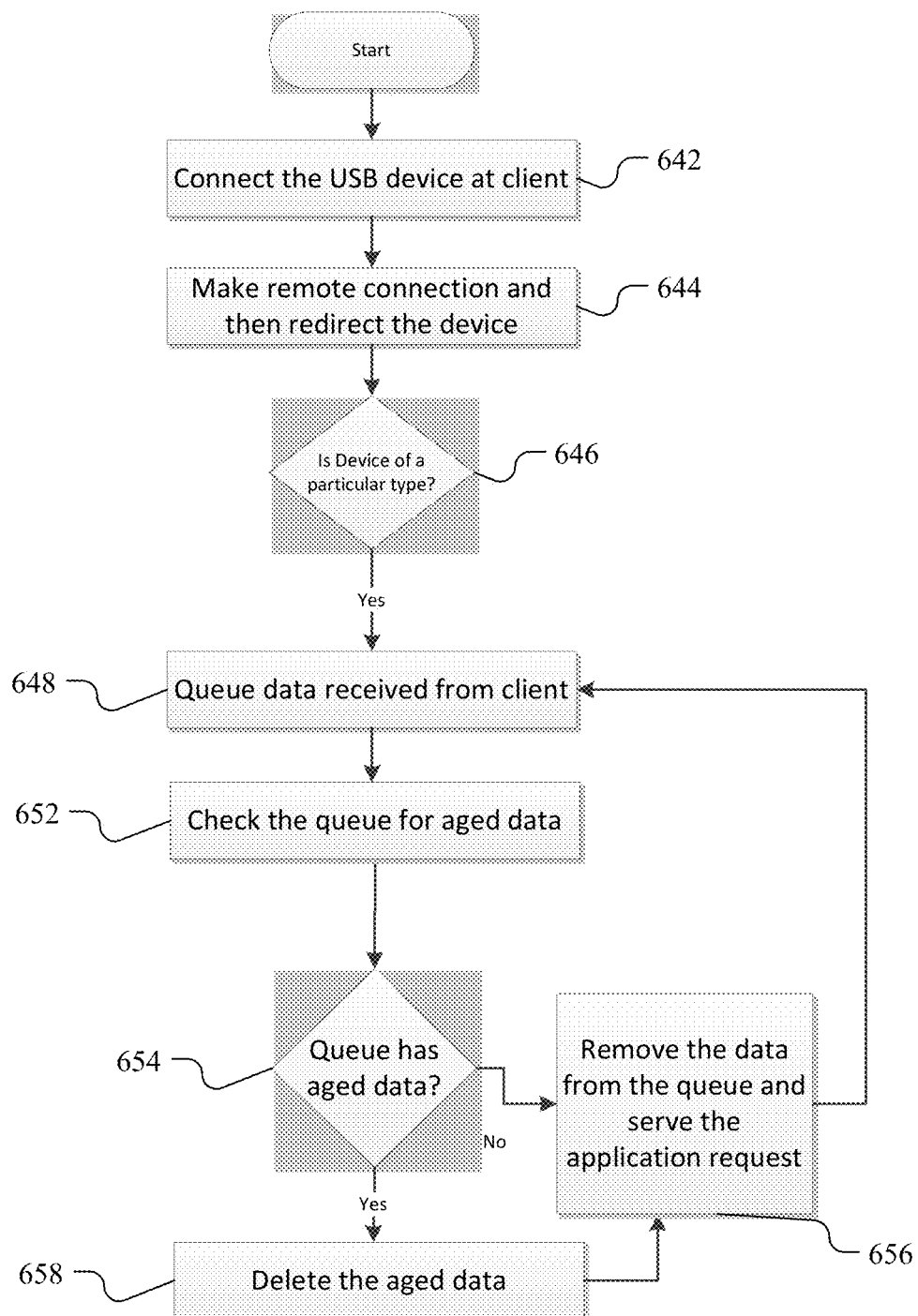
FIG. 6B illustrates another example method of redirecting USB device data to a server.
Figure 6C:
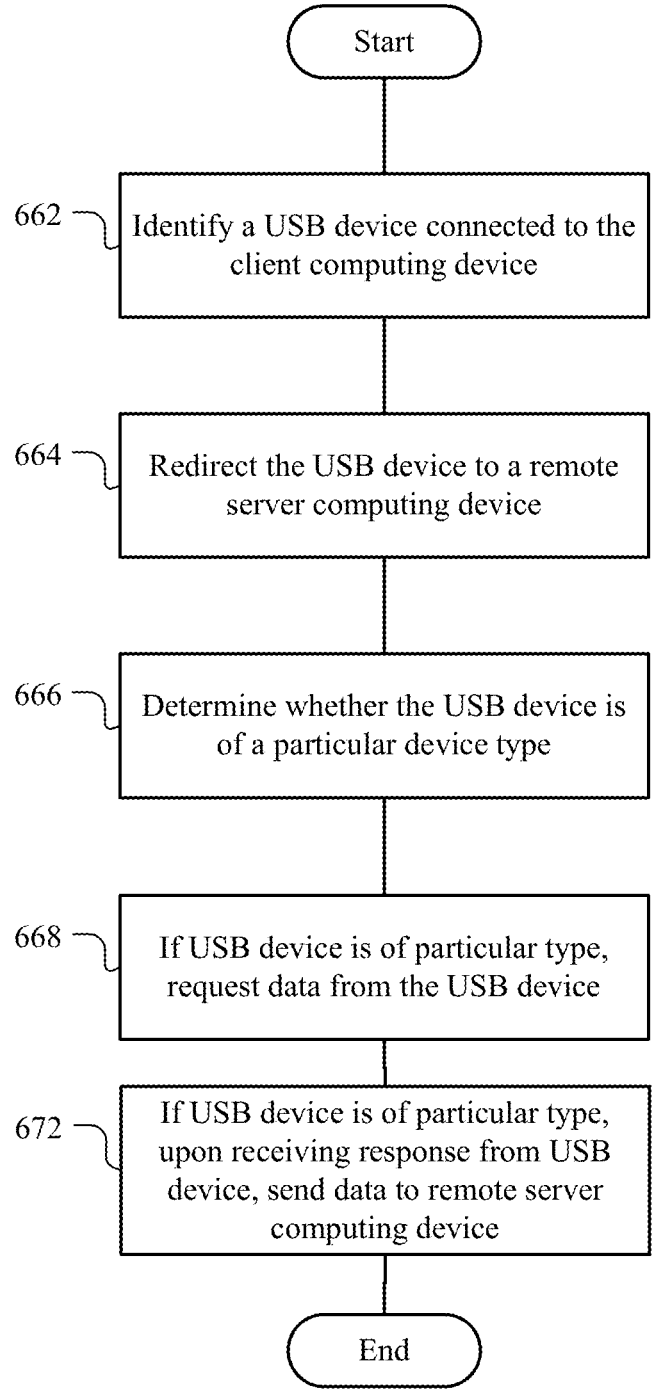
FIG. 6C illustrates an additional example method of redirecting USB device data to a server.

An example flow of the server-side process for redirecting USB device data to a server is shown in FIG. 6B. In the example of FIG. 6B, at step 642, USB device is connected at a client. At step 644, a remote connection is made to the server and the USB device is redirected to the server (e.g. using any suitable protocol, as described herein). A client-side component may determine at step 646 whether the USB device is of a particular type (e.g. a sign pad device or an authentication device). If the USB device is of a particular type, the server may be notified, and the server-side application may no longer send any requests for data to the USB device based on this information. The server may then in step 648 queue any USB device data received from the client (e.g. from the client-side component). Periodically (e.g. upon receipt of a new addition to the queue), the queue may be checked at step 652 for USB device data older than a pre-determined age (e.g. 500 milliseconds). If such aged data exists in the queue (determined in step 654), it is deleted at step 658. If, however, the queue does not have stale or aged data, then when an application or operating system of the server makes a request for data from the USB device, the request is served from this queue and removed from the queue in step 656. In particular embodiments, data is served from the queue in a first-in-first-out (FIFO) manner. This disclosure contemplates any suitable queuing algorithm for queuing and serving data from a queue.

Although some of the embodiments disclosed herein are described with reference to composite devices connected via universal serial bus, it should be understood that composite devices may be connected to information handling systems in any number of ways. As examples, a composite device may be connected via IEEE 1394, SATA, SCSI, Ethernet, PCI, PCIe, ISA, AGP, HDMI, DisplayPort, or other connection. In addition, a composite device may be connected wirelessly, including via wireless USB or Bluetooth.

Furthermore, the present disclosure may be applied to virtual composite devices, including devices that are physically remote from the client device performing the redirection of the interface. For example, a virtual composite device that is physically remote from a client device may be installed on a client device. Various solutions are available to support such virtual composite devices, including Dell Wyse TCX, Citrix HDX, and Vmview USB Redirection. In accordance with the present disclosure, the client device may maintain certain interfaces associated with such a virtual composite device as locally-installed interfaces, while redirecting other interfaces to a second computing system.

The term initialization, as used herein, may refer to a process that is performed when a device is first connected to a system or to a process performed when a device is being reconfigured, moved, or reinstalled (without regard to when it was connected, for example, or to any previous initializations or installations).

Figure 7:
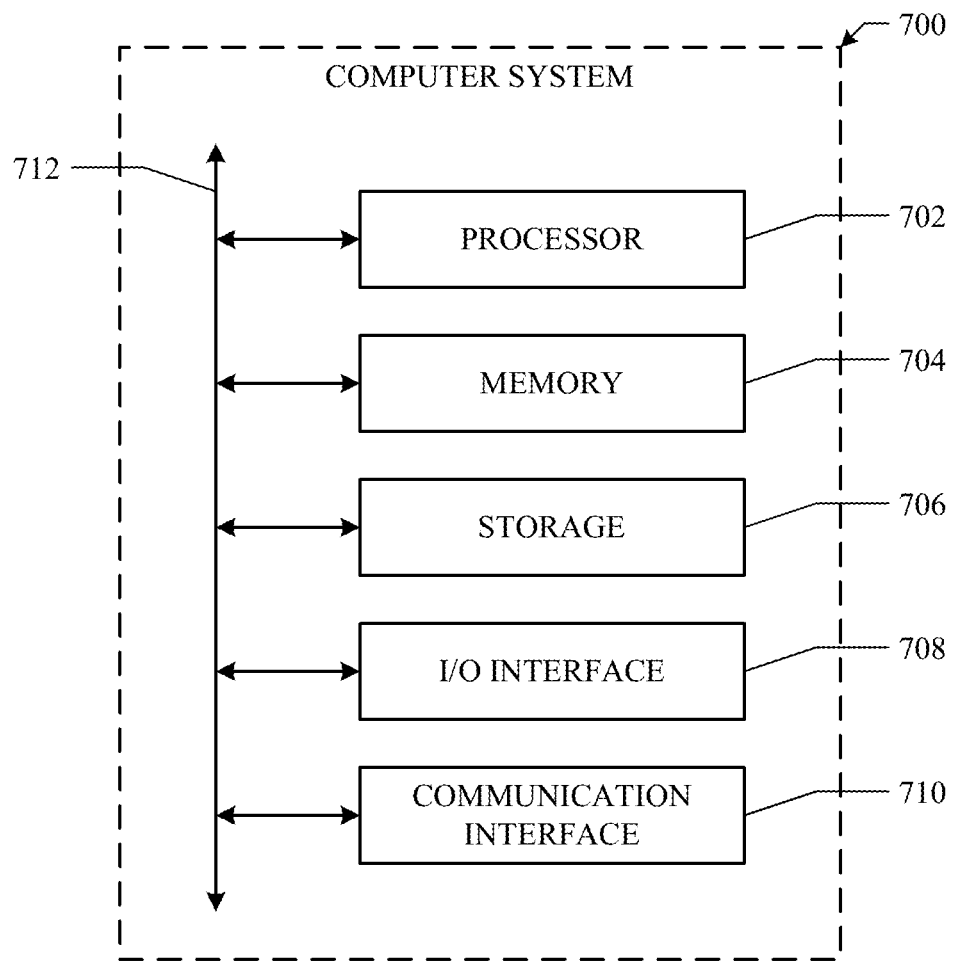
FIG. 7 illustrates an example computing system.

Particular embodiments may be implemented on one or more electronic devices or computer systems. FIG. 7 illustrates an example information handling system, computer system 700. For example, computer system 700 may be an embodiment for a device that runs a UI content editor. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 608, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a client computing device, identifying a Universal Serial Bus (USB) device connected to the client computing device, wherein one or more interfaces are associated with the USB device;
   by an interface redirection function driver of the client computing device, reading one or more descriptors associated with the USB device, wherein the one or more descriptors comprise at least one of a device descriptor, a configuration descriptor, and an interface descriptor;
   by the interface redirection function driver, parsing the one or more descriptors to create one or more independent virtual devices based, at least in part, on functionality of the one or more interfaces;
   grouping at least one of the one or more interfaces into at least one of the one or more independent virtual devices based, at least in part, on functionality of the one or more interfaces, wherein the system is adapted to group the one or more interfaces with a plurality of the one or more independent virtual devices;
   by the client computing device, redirecting the grouped one or more interfaces to a remote server computing device such that the one or more independent virtual devices associated with the grouped one or more interfaces are available to one or more applications associated with the remote server computing device as if locally installed at the remote server computing device;
   by the client computing device, passing to the remote server computing device at least one of an interface number associated with each of the one or more interfaces and the one or more descriptors;
   by the client computing device, determining whether the USB device is of a particular device type; and
   if the USB device is determined to be of the particular device type:
      by the client computing device, notifying the remote server computing device of the determined particular device type;
      by the client computing device, receiving, from the remote server computing device, a request for data from the USB device;
      by the client computing device, requesting the data from the USB device; and
      upon receiving a response from the USB device comprising the requested data, sending the response to the remote server computing device.

2. The method of claim 1, wherein the particular device type comprises signature pad devices.

3. The method of claim 1, further comprising, if the USB device is not determined to be of the particular device type:
- by the client computing device, waiting for a data request from the remote server computing device;
- by the client computing device, in response to receiving a data request from the remote server computing device, reading data from the USB device; and
- by the client computing device, sending the data to the remote server computing device.

4. The method of claim 1, wherein the remote server computing device is operable to queue data received from the client computing device.

5. The method of claim 4, wherein data in the queue is deleted once it reaches a pre-determined threshold age.

6. The method of claim 5, wherein the pre-determined threshold age may be dynamically determined, and wherein the pre-determined threshold age corresponds to an amount of time elapsed since the data was received by the remote server computing device.

7. The method of claim 4 wherein the remote server computing device provides data from the queue in response to a request from an application to read the USB device.

8. The method of claim 1, wherein redirecting the USB device to the remote server computing device is performed for a particular class of USB transfer data.

9. The method of claim 8, wherein the particular class of USB transfer data comprises one or more of the following:
- USB BULK data;
- USB INTERRUPT data;
- USB ISOCHRONOUS data; or
- USB CONTROL data.

10. The method of claim 1, wherein the USB device is a composite device.

11. An information-handling system comprising:
- one or more processors; and
- a memory coupled to the processors comprising instructions executable by the processors, the processors being operable when executing the instructions to:
  - identify a Universal Serial Bus (USB) device connected to a client computing device, wherein one or more interfaces are associated with the USB device;
  - read one or more descriptors associated with the USB device, wherein the one or more descriptors comprise at least one of a device descriptor, a configuration descriptor, and an interface descriptor;
  - parse the one or more descriptors to create one or more independent virtual devices associated with the one or more interfaces;
  - group at least one of the one or more interfaces into at least one of the one or more independent virtual devices based, at least in part, on functionality of the one or more interfaces, wherein the system is adapted to group the one or more interfaces with a plurality of the one or more independent virtual devices;
  - redirect the grouped one or more interfaces to a remote server computing device such that the one or more independent virtual devices associated with the grouped one or more interfaces are available to one or more applications associated with the remote server computing device as if locally installed at the remote server computing device;
  - pass to the remote server computing device at least one of an interface number associated with each of the one or more interfaces and the one or more descriptors;
  - determine whether the USB device is of a particular device type; and
  - if the USB device is determined to be of the particular device type:
    - notify the remote server computing device of the determined particular device type;
    - receive from the remote server computing device a request for data from the USB device;
    - request the data from the USB device; and
    - upon receiving a response from the USB device comprising the requested data, send the response to the remote server computing device.

12. The information-handling system of claim 11, wherein the particular device type comprises signature pad devices.

13. The information-handling system of claim 11, further comprising, if the USB device is not determined to be of the particular device type:
- wait for a data request from the remote server computing device;
- in response to receiving a data request from the remote server computing device, read data from the USB device; and
- send the data to the remote server computing device.

14. The information-handling system of claim 11, wherein the remote server computing device is operable to queue data received from the client computing device.

15. The information-handling system of claim 14, wherein data in the queue is deleted once it reaches a pre-determined threshold age.

16. The information-handling system of claim 15, wherein the pre-determined threshold age may be dynamically determined, and wherein the pre-determined threshold age corresponds to an amount of time elapsed since the data was received by the server computing device.

17. The information-handling system of claim 14, wherein the remote server computing device provides data from the queue in response to a request from an application to read the USB device.

18. The information-handling system of claim 11, wherein redirecting the USB device to the remote server computing device is performed for a particular class of USB transfer data.

19. The information-handling system of claim 18, wherein the particular class of USB transfer data comprises one or more of the following:
- USB BULK data;
- USB INTERRUPT data; or
- USB CONTROL data.

20. The information-handling system of claim 11, wherein the USB device is a composite device.

* * * * *